United States Patent Office 3,576,909
Patented Apr. 27, 1971

3,576,909
CATALYZED ISOMERIZATION OF α-β UNSATURATED CARBOXYLIC ACID ESTERS
Claude J. Schmidle, Hudson, and Arden E. Schmucker, Hartville, Ohio, assignors to The General Tire & Rubber Company
No Drawing. Filed Jan. 19, 1968, Ser. No. 699,025
Int. Cl. C08f 1/76, 21/02, 27/00
U.S. Cl. 260—864                                   5 Claims

ABSTRACT OF THE DISCLOSURE

Morpholine or its alkyl derivatives are used as catalysts for the isomerization of α-β unsaturated esters of cis-configuration into trans-configuration. The isomerization may proceed at low temperatures with good yields and is useful for production of fiber reinforced plastic lamination resins from maleic anhydride via maleate polyesters, which are then isomerized to fumarate polyesters.

BACKGROUND OF THE INVENTION

Esters formed from α-β unsaturated dicarboxylic acids are used in large quantities for the manufacture of resin and plastic materials. A principal commercial use for these polyesters is in the formation of resin forming compositions used in the preparation of fiber reinforced plastic laminates, e.g., glass fiber reinforced molded laminates including motor vehicle bodies, boat hulls, building panels and the like. In such operations, the unsaturated polyester is generally combined with a copolymerizable vinyl compound, such as styrene, to form the plastic or resin binder for fiber reinforced laminates.

Because of its ready availability through catalyzed oxidation of hydrocarbons which can be obtained cheaply and in very large quantities, maleic anhydride constitutes a major source of the unsaturated dicarboxylic acid component for the unsaturated polyesters. Not only is maleic anhydride attractive in the formation of the polyesters because of its availability and relatively low cost, but also because of its relatively high reactivity in the formation of the polyesters. One method for the manufacture of such unsaturated polyesters is copolymerization of maleic anhydride with epoxides. Alternatively, maleic anhydride may be directly esterified with alcohols, glycols and other polyol compounds to form unsaturated polyesters. The use of maleic anhydride or maleic acid in these reactions principally results in the production of maleate polyesters, i.e., polyesters of α-β unsaturated dicarboxylic acid of a cis-configuration.

The trans-configuration of polyesters are much preferred for use in the formation of resin producing binders for fiber reinforced plastic laminates than is the cis-configuration. The trans-configuration polyesters produce resin binders having much improved and more desirable properties than corresponding cis-configuration polyesters. However, since the production of the unsaturated esters by way of maleic anhydride or maleic acid are advantageous from cost and availability viewpoints as explained above, the obtainment of the fumarate polyesters from the maleate polyesters is generally accomplished by isomerization of the maleate polyesters.

It has been known for some time that primary and secondary amines can function as catalysts for isomerization of maleates into fumarates (see Nozaki, Journal of the American Chemical Society, 63, 2681 of 1941). The reported research showed that there was a correlation between the effectiveness of a primary or secondary amine as a catalyst and the basic strength of the amine, i.e., the stronger the base in general, the better it proved to be as a catalyst for the isomerization. Thus, piperidine had the highest basic strength of all of the primary and secondary amines investigated and exhibited the highest catalytic activity. The use of piperidine as a catalyst in the isomerization of conventional polyesters was subsequently adapted to production of resin forming products (see British Pat. 1,002,717).

In spite of the developments in production of unsaturated polyesters and particularly their preparation in the trans-form by isomerization of corresponding cis-polyesters as mentioned above still leaves necessary improvements to be made in this type of operation. For example, it is desirable to have available further methods for isomerization of maleate into fumarate polyesters so improved as to permit the isomerization to be accomplished at relatively low temperatures in high yields for a given period of time. Additionally, improvements in the costs of these operations both from the viewpoint of the agent expense and process time would be advantageous.

A principal object of this invention is the provision of new improvements in the catalyzed isomerization of α-β unsaturated carboxylic acid polyesters from a cis-configuration into a trans-configuration. Further objects include the provision of:

(1) A method for the isomerization of maleate esters into fumarate esters with increase in efficiency and reduction of costs of such operations.

(2) Improved methods for isomerization of telechelic polyesters of maleic acid into the corresponding fumarate esters.

(3) New compositions for use in the production of plastic molding materials containing as a major component a polyester of an α-β unsaturated dicarboxylic acid.

(4) A new class of catalysts for use in the isomerization of maleate esters to fumarate esters.

(5) New processes for the production of polymerizable unsaturated polyester compositions involving the esterification of maleic acid or maleic anhydride with a polyhydric alcohol or equivalent reagent, including epoxy compounds, to form a polyester maleate followed by the isomerization of a major portion of the maleate polyester into the corresponding fumarate polyester.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood that the foregoing abstract of the disclosure is for the purpose of providing a non-legal brief statement to serve as a searching-scanning tool for scientists, engineers, and researchers and is not intended to limit the scope of the invention as disclosed herein. Nor is it intended that it should be used in interpreting or in any way limiting the scope or fair meaning of the appended claims.

SUMMARY OF THE INVENTION

These objects are accomplished in accordance with the present invention by a method of isomerizing an ester of an unsaturated dicarboxylic acid of cis-configuration into the trans-configuration, which comprises:

(a) Adding a catalytic amount of heterocyclic compound of the formula:

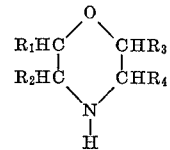

wherein $R_1$ to $R_4$ are hydrogen or 1 to 5 carbon atom alkyl to an unsaturated dicarboxylic acid ester of cis-configuration, and (b) Heating the mixture at a temperature between about 15 to 110° C. until an appreciable quantity of said ester has been isomerized from cis-configuration into trans-configuration.

A preferred heterocyclic compound for use in accordance with the invention as catalyst is morpholine. Advantageously, this material, or other heterocyclic compound as hereinbefore defined, is used in amount between about 0.01 to 5% by weight based upon the weight of the unsaturated ester to be isomerized.

The new methods of isomerization are particularly useful in the formation of polymerization compositions for use in plastic molding operations which contain as an active component a copolymerizable vinyl compound. Such polymerizable compositions will contain a substantial portion of a fumarate polyester which is derived from the corresponding polyester of maleic acid. Advantageously, such polymerizable compositions will comprise between about 10 to 90% of unsaturated polyester and about 10 to 90% of copolymerizable vinyl compound, preferably styrene before the isomerization step. Following isomerization, between about 50 and 90% of the maleic acid polyester will advantageously have been converted into the corresponding fumarate polyester.

The success of the present invention is due in part to the discovery that although morpholine is a relatively weak base, it is very effective as a catalyst for the isomerization of maleate esters into fumarate esters. This discovery runs counter to the prior concept that effectiveness of primary and secondary amine catalysts for the isomerization is roughly proportional to the base strength of the amine. The relatively weak base strength of morpholine is illustrated by the following table of base strengths of amines as reported by Hall in the Journal of Physical Chemistry, 60, 1963 (1956):

|  | $pK_A$ |
|---|---|
| Pyrrolidine | 11.32 |
| Piperidine | 11.20 |
| Diethylamine | 11.00 |
| Cyclohexylamine | 10.79 |
| Ethylamine | 10.75 |
| Methylamine | 10.64 |
| Dimethylamine | 10.61 |
| Ethanolamine | 9.45 |
| Morpholine | 8.36 |

The success of the present invention is further dependent upon the discovery that morpholine is active as an isomerization catalyst in this general type of reaction at relatively low temperatures, e.g., 25 to 80° C. permitting high yields of fumarate ester to be obtained from maleate ester at these temperatures in as little as 4 hours. Accordingly, a noteworthy feature of the improved isomerization processes is the ability to avoid use of high temperatures which necessarily increase the cost of isomerization. This, coupled with the relative cheapness of morpholine as the active catalyst, renders the new operations very attractive commercially.

Solvents may be used to reduce the viscosity of viscous polymers or to dissolve the solid ones and to enable ready admixture of the morpholine compound. About 30% by weight of solvent is generally used, although this can vary with the viscosity of the material. The solvent should be inert and a number of such are available, e.g., benzene, toluene, and so forth. The solvent is removed before the polyester and styrene are mixed with the necessary ingredients for forming the glass laminate, before adding the glass fibers or glass laminate, or before curing.

The styrene, or other suitable substituted styrene, can be added before or after isomerization to the polyester. The morpholine compound does not cause gelling or crosslinking in the presence of styrene. In the SPI test a peroxide catalyst is used to cause cross-linking.

DISCUSSION OF PREFERRED EMBODIMENTS

The following details of operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

Example 1

A telechelic polyoxy propylene polyester of maleic acid was prepared using a double metal cyanide complex type catalyst with the reagents in the parts listed below:

| Zinc hexacyanocobaltate complex | 4 |
|---|---|
| Fumaric acid | 464 |
| Maleic anhydride | 1764 |
| Phthalic anhydride | 3256 |
| Propylene oxide | 2908 |

The condensation reaction was preformed by charging all of the reagents as listed into an autoclave except for the propylene oxide and 1 part of the catalyst. The autoclave was then closed and all but 936 parts of the propylene oxide were pumped into the contained liquid mixture. The resulting mixture was allowed to react for about one hour at 77° C. when the remainder of the propylene oxide and catalyst were pumped into the autoclave. The reaction was then continued at 94° C. for another six hours. The resulting product was a clear viscous liquid having an acid No. of 0.84 and a molecular weight of 2000.

A test sample of the 5 parts of the polyester was thieved from the autoclave and tested for maleate and fumarate content by infra-red spectrographic analysis (maleate peak 1400 cm.$^{-1}$ and fumarate peak 770 cm.$^{-1}$). The polyester gave very little IR response for fumarate content, but a strong response for maleate content was obtained.

There was then mixed into the polyester contained in the autoclave 22 parts of morpholine and this mixture was heated for two hours at 38° C. A second test sample of the resulting polyester was subjected to infra-red analysis and was found to contain at least 50% fumarate content.

A resin forming composition for glass fiber lamination was made from the isomerized telechelic polyester by addition thereto of 3600 parts of styrene (43%) plus 0.4 part of tert.-butyl catechol and 0.9 part of hydroquinone as inhibitors. This polymerizable composition was tested for polymerization characteristics using the "SPI Procedure for Running Exotherm Curves—Polyester Resins" as approved by the Society of Plastics Industry, Reinforced Plastics Division, on Sept. 2, 1960. The following data were obtained for values determined by this so-called gel test:

| Gel time | minutes | 2.7 |
|---|---|---|
| Peak temperature | ° F | 402 |
| Peak time | minutes | 4.6 |

Example 2

The procedure of Example 1 was repeated using the following reactants in the parts by weight indicated:

| Zinc hexacyanocobaltate complex | 4 |
|---|---|
| Fumaric acid | 464 |
| Maleic anhydride | 1764 |
| Phthalic anhydride | 3256 |
| Propylene oxide | 3364 |

After reaction of all but 936 parts of PO and 1 part ZHCC for one hour at 77° C., these withheld portions were added to the autoclave and the mixture was heated at 94° C. for another eleven hours. The resulting product was a clear viscous liquid having an acid number of 1.22 and a molecular weight of 2000.

Infra-red tests before and after isomerization with 22 parts morpholine at 38° C. for two hours were comparable to those of Example 1.

A resin forming composition prepared for the isomerized polyester, 3600 parts of styrene, 0.4 part TBC and 0.9 part HQ gave the following data with the SPI gel test.

Gel time _____ minutes__ 2.8
Peak temperature _____ ° F__ 418
Peak time _____ minutes__ 4.9

Example 3

A blend was prepared by mixing together the isomerized polyester and styrene mixtures of Examples 1 and 2. The SPI gel test run on the blend gave the following results:

Gel time _____ minutes__ 2.3
Peak temperature _____ ° F__ 424
Peak time _____ minutes__ 4.0

Then 0.65 part of benzoquinone were added to the total quantity of the blend (about 21,500 parts) and a second SPI gel test was made giving the following results:

Gel time _____ minutes__ 4.9
Peak temperature _____ ° F__ 418
Peak time _____ minutes__ 7.2

A Brookfield viscosity determination was made on this blend using a No. 2 spindle giving the following results:

R.p.m.: Cps.
4 _____ 1,420
20 _____ 1,420

After standing 23 days at ambient temperature, another SPI Gel test was made on the blend giving the following results:

Gel time _____ minutes__ 2.5
Peak temperature _____ ° F__ 417
Peak time _____ minutes__ 4.6

A batch of laminating resin was prepared by mixing 600 parts of the foregoing blend with 300 parts of clay and 12 parts of benzoyl peroxide. Fiberglass panels were then prepared by placing glass fiber mat in a mold and pouring a quantity of one of these resin batches over the mat, closing the mold, and curing the mold contents under 600 p.s.i. for 3.5 minutes at 120° C. The statistics on these panels are reported in the following table:

TABLE I

| | Panel | | | | |
|---|---|---|---|---|---|
| | A | B | C | D | E |
| Resin batch | "A" | "A" | "B" | "B" | "B" |
| Resin parts | 341 | 378 | 438 | 424 | 430 |
| Glass parts | 184 | 187 | 189 | 192 | 190 |
| Percent glass | 35 | 33 | 30 | 31 | 31 |
| Sheet thickness in mils (range) | 89/90 | 92/100 | 103/109 | 97/113 | 99/111 |
| Smoothness, microinches | 666 | 614 | 633 | 589 | 619 |
| Reverse impact, in. less than | 4— | 4— | 4— | 6— | 4— |
| Flexure strength R.T. (p.s.i.) | 24,300 | 24,800 | 19,700 | 23,100 | 24,200 |
| Flexure modulus R.T. (p.s.i.× 10⁻⁶) | 1.18 | 1.18 | 1.17 | 1.10 | 1.23 |
| Tensile strength (p.s.i.) | 16,100 | 9,900 | 13,800 | 11,400 | 11,400 |
| Percent elongation | 2 | 2 | 3 | 2 | 2 |
| Notched Izod (ft./lbs./in.) | 14.0 | 15.1 | 14.2 | 14.1 | 13.0 |

NOTE: "A"=6 parts peroxide, resin poured on center of gloss, "B"=7.2 parts peroxide, resin poured on gloss in Z pattern.

The various data in Table I were obtaining using ASTM and other industry tests.

Example 4

A telechelic unsaturated polyester was prepared by first placing in an autoclave the following ingredients in the indicated parts by weight:

Maleic anhydride _____ 2940
Benzene _____ 2000
Pentanediol _____ 260
Zinc hexacyanocobaltate complex _____ 3

The autoclave was then closed and 1740 parts of propylene oxide were charged into it. These contents of the autoclave were then stirred by an internal impeller agitator and reacted for three hours at 79° C. followed by two hours at 94° C. At that time a small 5 part sample was thieved from the autoclave and the acid number determined. Since this was found to be more than 3.0, 116 parts of propylene oxide were added and the reaction mixture again heated for one hour at 94° C. This procedure was repeated three more times, until an additional total of 464 parts of propylene oxide had been added and the acid number was below 3.0. The autoclave was then cooled to 40° C. and the clear, light brown liquid polyester was removed and transferred to a storage container.

Isomerizations were run on small portions of this polyester using various amines as isomerization catalysts. For each isomerization 20 parts of polyester were mixed in a glass reactor with a quantity of amine and the mixture was reacted at least 30° C. for twenty hours or more. Finally, the reaction products were tested for maleate and fumarate content by infra-red analysis by noting the height of the trace peaks at 1400 cm.$^{-1}$ for maleate and 770 cm.$^{-1}$ for fumarate. The results are indicated in Table II which also reports the parts by weight of amine used in each isomerization and the respective time and temperature.

TABLE II

| Run: | Amine | Amount | Time, in hours | Temp., ° C. | Maleate | Fumarate |
|---|---|---|---|---|---|---|
| A | Piperidine | 0.2 | 20 | 30 | Nil | Large. |
| B | do | 0.2 | 20/30 | 30/50 | Nil | Do. |
| C | Morpholine | 0.2 | 20 | 30 | Nil | Do. |
| D | do | 0.2 | 20/30 | 30/50 | Nil | Do. |
| E | Benzyl trimethyl ammonium hydroxide | 0.6 | 20 | 30 | Large | Nil. |
| F | 2,6-dimethyl morpholine | 0.2 | 20 | 30 | Small | Large. |
| G | 2-mercaptoethanol | 0.2 | 20 | 30 | Large | Small. |
| H | None | | 20 | 30 | do | Nil. |

NOTE: In Runs B and D, reaction was at 30° C. for 20 hrs. and then at 50° C. for 30 hrs.

Example 5

Following the general procedure of Examples 1 and 2, above, a polyester was prepared from 1960 parts of maleic anhydride, 3256 parts of phthalic anhydride, 232 parts of fumaric acid, 3248 parts of propylene oxide and 6 parts of catalyst. To this product there was then added 4000 parts of styrene, 0.4 part of t-butyl catechol, and 0.9 part of hydroquinone. This mixture was stirred for 10 minutes at 93° C. and the batch was then cooled to 27° C. The product contained about 31% by weight of styrene, had a molecular weight of about 4000 and an acid number of 0.9.

Isomerizations were run on this product using piperidine and morpholine as the catalyst and compared with an uncatalyzed control. One percent of catalyst was used and the isomerization was conducted at 30° C. for four hours when an I.R. analysis was made for fumarate content. A portion was also subjected to an SPI gel test using 0.25% benzoyl peroxide polymerization catalyst. The remainder of each run was then heated at 30° C. for 26 more hours and a second portion removed for a similar SPI gel test. Finally, the remainder was heated for an overall total of 198 hours at 30° C. and a third SPI gel test made on the product. The results are reported in Table III.

TABLE III

| Agent | Time | Maleate | Fumarate | SPI GT | Gel PT | Test Pt |
|---|---|---|---|---|---|---|
| Piperidine | 4 | Nil | Large | 1.22 | 428 | 2.50 |
| Do | 30 | Nil | do | 1.07 | 428 | 2.14 |
| Do | 198 | Nil | do | 1.07 | 431 | 1.73 |
| Morpholine | 4 | Nil | do | 3.21 | 387 | 6.27 |
| Do | 30 | Nil | do | 1.98 | 420 | 3.67 |
| Do | 198 | Nil | do | 1.68 | 437 | 2.65 |
| None | 30 | Large | Nil | | | |

In Table II the column headed "GT" reports the time in minutes of the gel time, the column headed "PT" gives in ° F. the peak temperature and that headed "Pt" the peak time in minutes.

Example 6

A polyester made from maleic anhydride and propylene oxide using the general procedure of Example 1 was mixed with 30% styrene and isomerized at 30° C. for four hours with several amino compounds as isomerization catalysts. SPI gel tests were then performed on the resulting products with the results reported in Table IV.

TABLE IV

| Isomerization catalyst | 150°–190° F., min. | Peak temp., ° F. | 150° F., peak temp. (min.) |
|---|---|---|---|
| Cyclohexylamine | 2.14 | 384 | 4.28 |
| Piperidine | 1.07 | 431 | 1.74 |
| Morpholine | 1.68 | 437 | 2.65 |
| N-methylethylamine | 1.53 | 355 | 1.88 |

DISCUSSION OF DETAILS

The new methods for isomerization of α-β unsaturated polyesters of cis-configuration in accordance with the invention may be successfully employed with any such type of polyester, e.g., any type of maleate ester or polyester can be used including those which are hydroxy or carboxy terminated. Additionally, molecular weight is not critical although high molecular weight of products may require heat to melt them, or their viscosity may require using a solvent, so that the isomerization may effectively be carried out. Styrene which is employed as a copolymerizable material in forming glass fiber reinforced laminates or other molded articles may serve as a solvent in most cases for the isomerization. This avoids the need to dispose of inert solvents in the final utilization of the isomerized polyesters. However, benzene, toluene, ketone, ethers, esters such as methylacetate and other solvents known to be useful in the handling and processing of polyesters may be employed.

Preferably the polyester to which the new methods of the invention are applied should have sufficiently high molecular weight so that it is useful when mixed with styrene or other copolymerizable materials including alkyl substituted styrenes, cross-linking agents such as divinyl benzene, or similar agents employed in the art of molding or other use of polyester resins. Conventional type of unsaturated polyesters formed by reaction of unsaturated dicarboxylic acids or their anhydrides with glycols or epoxides or mixtures thereof, e.g., any of the conventional polyesters as disclosed in British Pat. 1,002,717 which is incorporated herein by reference, may be employed in the new methods. The invention, however, is particularly advantageous for use with hydroxy or carboxy terminated telechelic polyesters formed by telomerization of epoxides with maleic anhydride using metal cyanide catalysts of the type disclosed in U.S. Pats. 3,278,457, 3,278,458, and 3,278,459. Polyesters and polythioesters of controlled configuration and molecular weight prepared by copolymerization of epoxides or other cyclic ethers containing two or three carbon atoms in the ring and organic anhydride in the presence of these double metal cyanide complex catalysts can be prepared as described in co-pending applications 643,036, filed June 2, 1967, and 676,712, filed Oct. 20, 1967, the disclosures of which applications are incorporated herein by reference.

Morpholine is the preferred isomerization catalyst for use in the new methods. Examples of other morpholine derivatives within the class hereinbefore defined include:

2,6-dimethyl morpholine
2,3,5,6-tetramethyl morpholine
2-amyl morpholine
2-butyl-6-ethyl morpholine
3-propyl-5-amyl morpholine
2,6-diethyl-3-propyl morpholine Advantageously, the morpholine compound of the class hereinbefore defined as used as an isomerization catalyst is selected for having solubility in the polyester in the amount desired for catalyzing the operation. However, a solvent may be employed to promote solution of the morpholine compound in the polyester if this is necessary or desirable in order to enhance the rate of reaction or as an aid in mixing or agitating the mixture or the like.

The amount of morpholine or other isomerization catalyst as defined used in the new methods may be varied. The amount used primarily depends upon the acid number of the polyester being isomerized. Advantageously, the polyesters are formed so as to keep the acid number low, preferably below 1. If the acid number is between 0 and 1, only about 0.1% of the isomerization catalyst by weight of the polyester is usually required to promote an appreciable degree of isomerization within a reasonable time, e.g., 50% or more conversion from cis- to trans-configuration within 20 hours at a temperature between 15° to 80° C. If the polyester being isomerized has an acid number above about 1, then the amount of morpholine or equivalent compound to use will be an equivalent ratio of at least 4 to 1 per carboxylic acid group contained in the polyester as determined by acid number. As an alternative, neutralization of the polyester to reduce the acid number may be accomplished by the use of soluble alkalies, amines, quaternary ammonium compounds or the like. An excess of morpholine or equivalent is not necessarily detrimental to the isomerization and in commercial practice quantities between 0.01 and 5% by weight based upon the weight of the unsaturated polyester may be employed.

A noteworthy feature of the new isomerization methods is the ability to convert the cis-configuration to trans-configuration at relatively low temperatures. Thus, conversion of 50% or more can be obtained in as little as four hours at temperatures of 25° to 32° C. With viscous polymers which may exhibit resistance to isomerization, temperatures as high as 80° C. with times up to 60 hours may be employed. In contrast, conversions of 50% or greater can be obtained in some cases at temperatures as low as 15° C. and/or times as low as one hour. The possibility of obtaining substantial conversions from cis- to trans-form in the unsaturated polyesters at low temperatures and for short periods of time is important because of reduced costs of isomerization, avoidance of undesirable side reactions, alteration in molecular weight or degree of polymerization and the like. In some cases, exothermic heat may be encountered when the catalyst is first mixed with the polyester so that provision for heat control, agitation and the like is recommended in conducting the isomerizations.

The embodiments of the invention in which an exclusive property or right is claimed are defined as follows:

1. In a process for the preparation of a polyester predominating in fumarate esters by isomerization of maleate polyester, the steps of effecting the isomerization by:
  (a) adding to a maleate polyester, which is a reaction product of maleic acid or maleic anhydride with a glycol, an epoxide or mixtures thereof, having an acid number below about 1, between about 0.01 and 5% by weight of heterocyclic compound of the formula:

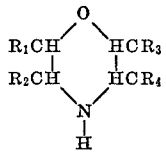

wherein $R_1$ to $R_4$ are hydrogen or 1 to 5 carbon atoms, alkyl, and (b) heating the product of step (a) at a temperature between about 15 and 110° C. until at least 50% of said maleate polyester has been isomerized to fumarate polyester.

2. A process as claimed in claim 1, wherein the heterocyclic compound is morpholine.

3. A process as claimed in claim 1, wherein said maleate polyester is a telechelic polyester of maleic acid or maleic anhydride.

4. A process as claimed in claim 1, wherein said maleate polyester is in admixture with a copolymerizable vinyl compound forming a polymerizable composition for plastic molding use.

5. A process as claimed in claim 4, wherein said vinyl compound is styrene and said polymerizable composition comprises about 10 to 90% of said maleate polyester and 10 to 90% styrene.

References Cited

UNITED STATES PATENTS

| | | | |
|---|---|---|---|
| 2,373,527 | 4/1945 | Agens | 260—75U |
| 2,779,783 | 1/1957 | Hayes | 260—75U |
| 3,373,144 | 3/1968 | Janssen et al. | 260—75U |
| 2,914,559 | 11/1959 | Stefaniak | 260—75UX |
| 3,445,410 | 5/1969 | Coulter | 260—864X |

OTHER REFERENCES

Chem. Abstract: vol. 68 (1968), Kaplan et al. "Hardening of Unsaturated Polyester Resin," May 4, 1967.

WILLIAM H. SHORT, Primary Examiner

R. J. KOCH, Assistant Examiner

U.S. Cl. X.R.
260—40, 75, 78.4